(12) United States Patent
Kemnitz et al.

(10) Patent No.: US 9,114,769 B1
(45) Date of Patent: Aug. 25, 2015

(54) VEHICLE SENSOR ASSEMBLY WITH LEVER ASSIST

(71) Applicant: Ford Global Technologies, LLC, Dearborn, MI (US)

(72) Inventors: Erich Kemnitz, Northville, MI (US); Steven Yellin Schondorf, Dearborn, MI (US); Jayagopal Appukutty, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/173,944

(22) Filed: Feb. 6, 2014

(51) Int. Cl.
*B60R 19/48* (2006.01)

(52) U.S. Cl.
CPC ............... *B60R 19/483* (2013.01); *B60R 19/48* (2013.01)

(58) Field of Classification Search
CPC ...... B60R 19/02; B60R 19/023; B60R 19/48; B60R 19/483; B60R 21/013; B60R 21/0134; B60R 21/34
See application file for complete search history.

(56) References Cited

U.S. PATENT DOCUMENTS

| | | | | |
|---|---|---|---|---|
| 6,203,366 | B1 * | 3/2001 | Muller et al. | 439/561 |
| 6,279,210 | B1 * | 8/2001 | Faass et al. | 24/457 |
| 6,318,774 | B1 * | 11/2001 | Karr et al. | 293/117 |
| 7,303,041 | B2 * | 12/2007 | Stuve | 180/274 |
| 7,753,419 | B2 * | 7/2010 | Kondo | 293/117 |
| 7,784,855 | B2 * | 8/2010 | Faass et al. | 296/187.01 |
| 2005/0154530 | A1 * | 7/2005 | Hosokawa et al. | 701/301 |
| 2006/0232081 | A1 * | 10/2006 | Sato et al. | 293/117 |
| 2006/0267359 | A1 * | 11/2006 | Blake | 293/120 |
| 2011/0043344 | A1 * | 2/2011 | Nichols et al. | 340/436 |
| 2013/0250732 | A1 * | 9/2013 | Tsuji et al. | 367/173 |

* cited by examiner

*Primary Examiner* — Lori L Lyjak
(74) *Attorney, Agent, or Firm* — Frank A. MacKenzie; Brooks Kushman P.C.

(57) ABSTRACT

A fascia assembly may include a fascia having an inner surface, a sensor assembly including a housing integrated with the inner surface, a sensor having a connector, and a lever rotatably attached to the sensor. The lever may be configured to selectively rotate between first and second positions when inserted into the housing, and may include a tab to prevent mating access to the connector when the lever is in the first position but not in the second position.

21 Claims, 5 Drawing Sheets

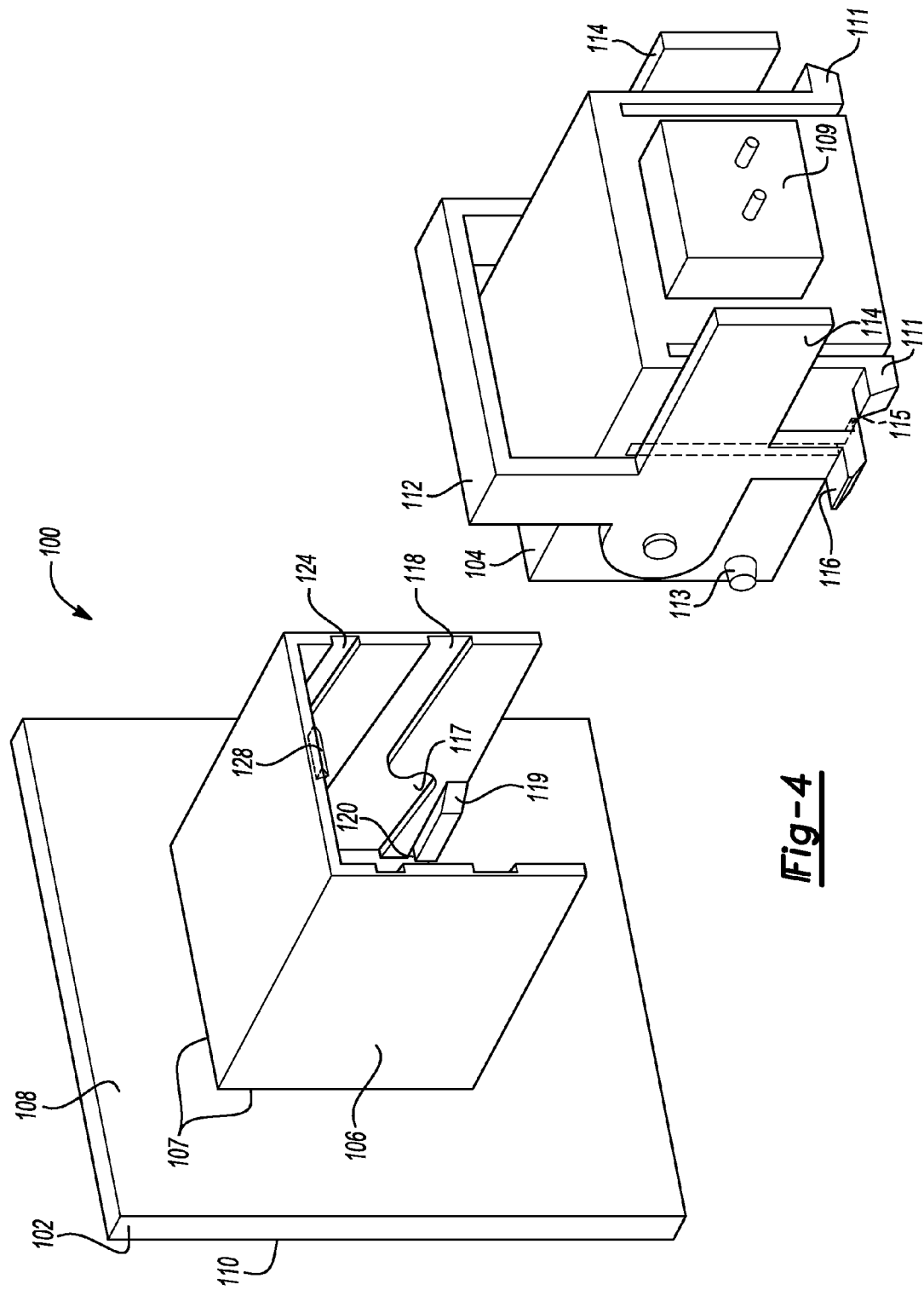

VEHICLE SENSOR ASSEMBLY WITH LEVER ASSIST

TECHNICAL FIELD

This disclosure relates to the attachment of sensors to vehicle components.

BACKGROUND

Automotive vehicles use environment awareness to improve vehicle performance and vehicle safety features. Consumer appetites and automotive regulations may push demand for environment awareness improvements. Vehicle structures may operate with sensor systems to obtain information on a surrounding environment and direct corresponding vehicle responses. On-board vehicle systems may obtain different types of information from different locations on the vehicle. These vehicle systems may include sensors and sensor systems to assist in obtaining the information. A position and/or location of these sensors on-vehicle typically play a role in the operation of the sensor and sensor systems. Additionally, these sensor systems may be designed to facilitate efficient installation and/or assembly processes.

SUMMARY

A vehicle includes a bumper beam, a bumper cover including an inner surface, and a sensor assembly disposed between the beam and cover. A housing is integrated with the inner surface and defines at least one interior lever guide and at least one interior ramp. A sensor includes a connector, at least one exterior sensor tab, and a lever rotatably attached to the sensor. The lever is configured to selectively rotate between first and second positions, and defines at least one lock tab, an extrusion, and a connector prevention tab proximate to the connector. The connector prevention tab is configured to prevent mating access to the connector when the lever is in the first position but not in the second position. The at least one lever guide is configured to receive the at least one extrusion to guide installation of the sensor within the housing as the at least one sensor tab is directed to move along the at least one ramp to release the at least one lock tab such that the lever may rotate from the first position to the second position. The at least one lock tab of the lever may further be configured to engage the at least one exterior sensor tab and hold the lever in the first position when the sensor is not installed within the housing. The housing may further define a hold tab configured to engage a portion of the lever to hold the lever in the second position. The sensor may further define at least one nub and the housing may further define at least one nub guide configured to receive the nub to further guide installation of the sensor within the housing. The at least one lever guide may define an extension portion configured to receive the at least one extrusion such that the lever may rotate when the at least one extrusion is positioned therein. The vehicle may also include a planar tab and the housing may be bonded to the inner surface via the planar tab. A material of the planar tab may be the same as a material of the bumper cover.

A vehicle includes a bumper beam, a bumper cover having an inner surface, a housing disposed between the bumper beam and bumper cover, and defining a base bonded to the inner surface, a sensor disposable within the housing and including a connector, and a lever rotatably attached to the sensor. The lever defines at least one lock tab configured to hold the lever in a first position relative to the sensor and, in response to the sensor being installed within the housing, to release the lever from the first position to permit the lever to rotate to a second position. The lever also defines two prevention tabs configured to prevent mating access to the connector when the lever is in the first position but not in the second position. The housing may further define at least one interior ramp configured to move an exterior sensor tab of the exterior sensor inward to release an engagement between the at least one lock tab and the exterior sensor tab. The housing may further define at least one lever guide configured to receive an extrusion defined by the lever to guide installation of the sensor within the housing. The housing may further define at least one interior nub guide configured to receive at least one nub defined by the sensor. The housing may further define a hold tab configured to engage a portion of the lever to hold the lever in the second position. The base may be bonded to the inner surface via a planar tab. A material of the planar tab may be the same as a material of the bumper cover.

A fascia assembly includes a fascia having an inner surface, a sensor assembly including a housing integrated with the inner surface, a sensor having a connector, and a lever rotatably attached to the sensor. The lever is configured to selectively rotate between first and second positions when inserted into the housing, and includes a tab to prevent mating access to the connector when the lever is in the first position but not in the second position. The lever may define at least one lock tab configured to maintain the lever in the first position until the sensor and lever are inserted into the housing. The housing may further define at least one interior ramp configured to move at least one exterior sensor tab when contacted to disengage an engagement between the at least one exterior sensor tab and a lock tab defined by the lever. The housing may further define a hold tab configured to flex and receive the lever such that the lever is held in the second position. The housing may further define at least one nub guide configured to receive at least one nub defined by the sensor. The integration of the housing with the inner surface may be facilitated via a planar tab defined by the housing and ultrasonically welded to the inner surface. The housing and inner surface may be molded or adhesively bonded together.

BRIEF DESCRIPTION OF THE DRAWINGS

FIG. 4 is a perspective view of a sensor assembly including a sensor and a housing.

DESCRIPTION

Figure 1:
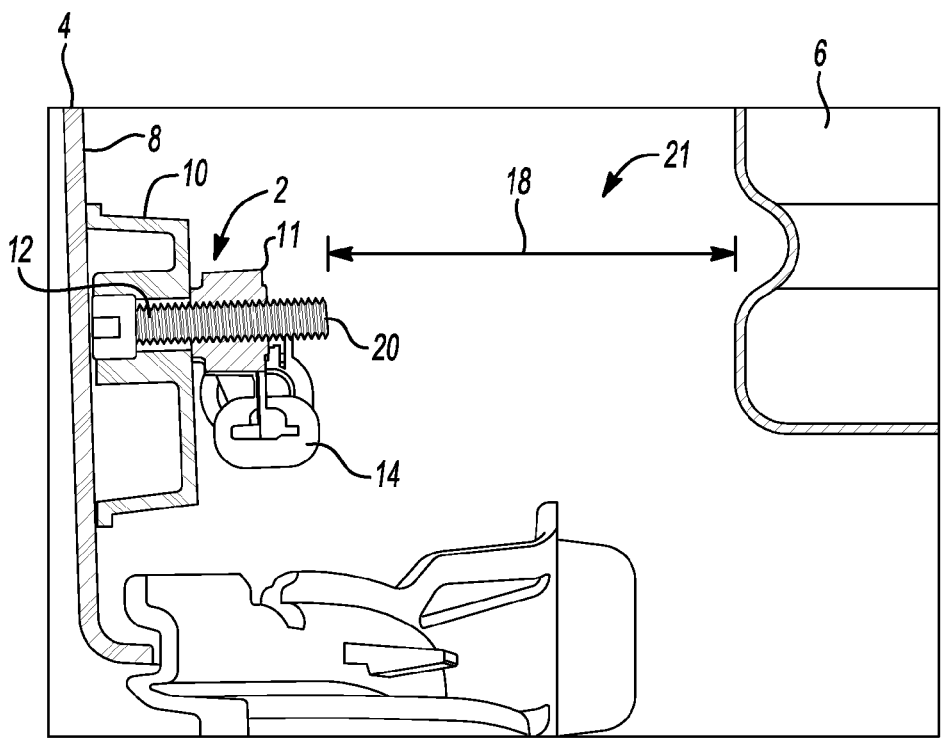
FIG. 1 is a side view, in cross-section, of a sensor assembly attached to a bumper cover via a stud, nut and bracket.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles include multiple safety features to assist in protecting vehicle occupants, the vehicle itself and surrounding objects. Structural safety features may be coupled with sensor systems to warn and/or alert a driver under certain circumstances, such as when the vehicle nears an object. One example of a sensor system is a vehicle parking aid system which may include a sensor to detect objects and a capability to sound an alert in response to object detection. As such, the parking aid system may alert the driver if, for example, the vehicle is nearing an object when backing into a parking space.

Another example of a sensor system is a pedestrian protection system to provide protection for pedestrians and/or to reduce pedestrian injury resulting from an impact with the vehicle. This type of sensor system may detect an object upon impact and activate a vehicle response. Certain sensors, such as impact sensors, may further determine the type of object impacting the vehicle and send a corresponding signal to a safety system to activate the vehicle response. The locations, positions and method of mounting these sensors often coincide with proximate vehicle structural features to provide desired performance.

For example, impact sensors may be positioned in an area between a vehicle's fascia and a vehicle's bumper beam. A bumper cover portion of the vehicle's fascia is one example of this type of area. Vehicle fascias typically include an A-surface and a B-surface. The A-surface and/or outer surface is a portion of the fascia facing "outward" and/or facing "off vehicle" (the surface typically seen by pedestrians and other motorists). The B-surface and/or inner surface is a portion of the fascia facing "inward" (the surface typically not seen by pedestrians and other motorists.) The B-surface of a bumper cover typically faces the bumper beam and/or an energy absorber. Current automotive applications for securing and/or positioning a sensor assembly at or near a fascia B-surface utilize a plastic assembly with a weld stud attached thereto. The plastic assembly is typically heat staked or welded to the B-surface. The sensor is then mechanically attached to the weld stud with a nut. The stud, however, is a hard point of contact extending toward the bumper beam which may be undesirable as described below.

Referring now to FIG. 1, an impact sensor assembly 2 is attached to a vehicle bumper cover 4 as known in the art. The sensor assembly 2 is mounted to a B-surface 8 of the bumper cover 4. The sensor assembly 2 includes a plastic bracket 10 with a stud 12 and a nut 11 to facilitate mounting an impact sensor 14 to the B-surface 8. Dimension 18 is a distance between an end 20 of the stud 12 and a bumper beam 6 within an area 21. The end 20 is an example of hard point of contact. Automotive safety standards may provide guidance on appropriate minimum distances between a hard point of contact and a bumper beam or a sensor assembly and the bumper beam, referred to herein as a crush distance. Automotive manufacturers may also have internal standards relating to the crush distance.

For example, an impact at or near the sensor assembly 2 on bumper cover 4 may direct the stud 12 and nut 11 toward the bumper beam 6. If the end 20 bottoms out against the bumper beam 6, the sensor 14 may cease operation due to damage and/or destruction. In terms of sensor performance, an impact in which the crush distance is too small may render the sensor 14 inoperable prior to completion of its tasks. In contrast, a larger crush distance may provide more time for the sensor 14 to operate following an impact. Therefore, it may be desirable to minimize and/or eliminate elements of sensor assemblies within the area 21 to maximize the crush distance. For example, a horizontal dimension of the plastic bracket 10 may contribute to a shorter crush distance since the nut 11 and stud 12 are needed to mechanically fasten the sensor 14 to the bumper cover 4. Additional safety requirements, such as a preferred number of stud 12 threads clearing the nut 11, may also contribute to a shorter crush distance. Eliminating the plastic bracket 10, nut 11 and stud 12 may result in a larger crush distance and one less hard contact point in the area 21.

Figure 2:
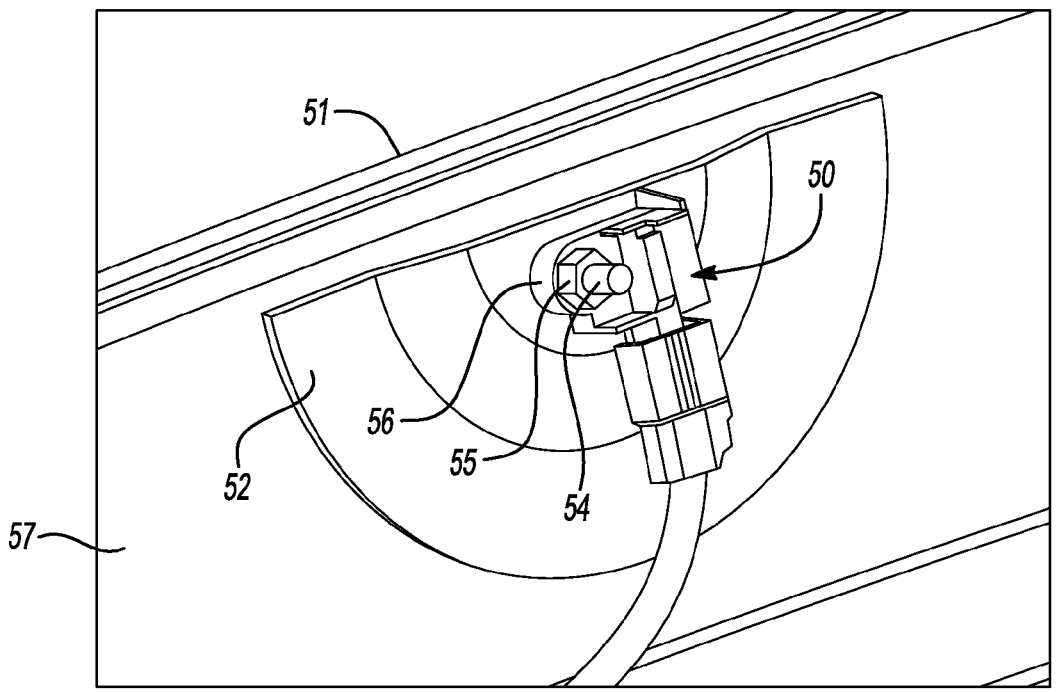
FIG. 2 is a perspective view of a sensor assembly mechanically fastened to a bumper cover via a stud, nut and bracket.

Now referring to FIG. 2, a sensor assembly 50 is attached to a vehicle fascia 51 as known in the art. Similar to sensor assembly 2, the sensor assembly 50 is mechanically attached to a bracket 52 via a stud 54, a nut 55 and a bushing 56. The bracket 52 is attached to a fascia B-surface 57 and the stud 54 extends toward a bumper beam (not shown). As with sensor assembly 2, a bracket, stud and nut combination such as bracket 52, stud 54 and nut 55 may influence a shorter and less desirable crush distance.

In addition to crush distance, a capability to detect a pedestrian at impact may be improved and/or increased when an impact sensor is at or near the leading edge of the vehicle, such as the vehicle's front or rear bumper cover (depending on the direction of vehicle movement). Typically, the leading edge of a vehicle comprises a fascia made up of a material which may be thin and include aesthetic design concerns. The aesthetic design concerns may limit and/or prevent usage of conventional fasteners which require piercing the front fascia, or fasteners which may deform the A-surface corresponding to the attachment location. The design constraints, performance requirements and aesthetic concerns mentioned above create multiple challenges for mounting sensors, such as pedestrian protection sensors, to a desired B-surface of a vehicle bumper cover and/or fascia.

Figure 3:
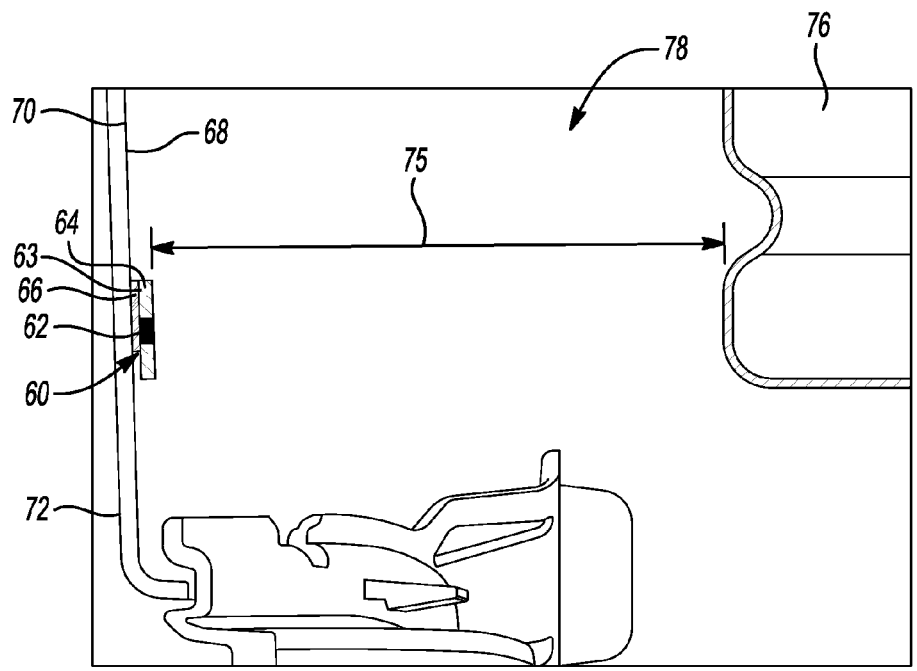
FIG. 3 is a side view, in cross-section, of a sensor assembly attached to a bumper cover.

FIG. 3 shows an illustrative sensor assembly, referred to generally as a first sensor assembly 60 positioned on a bumper cover or fascia of an automotive vehicle. The first sensor assembly 60 may include a sensor 62, a sensor housing 64 and a planar tab 66. The sensor housing 64 may define a base portion 63. Examples of a sensor 62 include but are not limited to acceleration sensors and/or pressure sensors. The tab 66 may be embedded into the sensor assembly 62 and may further be bonded to a fascia B-surface 68 of a fascia bumper cover 70. Two examples of bonding methods may include ultrasonic welding and adhesive bonding. The tab 66 may preferably have a thickness between one and three millimeters to facilitate a desired ultrasonic weld. An ultrasonic weld utilizing the tab 66 with a thickness above three millimeters may result in a dimple or other deformation to an A-surface 72 of the bumper cover 70. An ultrasonic weld utilizing the tab 66 with a thickness below one millimeter may not be strong enough to hold the first sensor assembly 60 to the B-surface 68. The tab 66 may be, without limitation, a plastic strip or a material the same as a material used for the corresponding bumper cover. The distance between the B-surface 68 and first sensor assembly 60 may be less than or equal to a desired tab 66 thickness. Additionally and/or optionally, the tab 66 may be an extension of the sensor housing 64.

As such and in contrast to the sensor assemblies in FIGS. 1 and 2, the first sensor assembly 60 may be positioned substantially on the B-surface 68 without mechanical fasteners, such as a stud, thereby minimizing the fore-aft space occupied by the first sensor assembly 60 and resulting in a greater crush distance shown as dimension 75. This configuration for first sensor assembly 60 may further minimize the number of vehicle components and/or elements within an area 78. A preferred length for dimension 75 may be equal to or greater than seventy millimeters, though the length of dimension 75 may vary in accordance with the first sensor assembly 60 thickness and tab 66 thickness. Each additional unit of measure added to the crush distance, in this case dimension 75, may provide additional benefits. More space between the bumper beam 76 and an exemplary point of impact at the bumper cover 70 may provide, for example and without limitation, (i) more time for a vehicle safety system to receive, process and respond to a detection signal from sensor 62 following impact; and (ii) a larger cavity and/or space, such as area 78, to operate as a crumple zone.

The first sensor assembly 60 may further provide advantages with regard to operator assembly in a line and/or subassembly environment. Examples of bracket mounting methods at present may include snapping, adhering and welding to a vehicle fascia. Some sensors, such as parking aid sensors, may require a hole or holes in the fascia to attach the sensor bracket(s) either before or after the fascias are painted. Other sensors, such as those used in pedestrian sensing systems, may not require a hole through a fascia but may include multiple other steps for both assembly and attachment. The first sensor assembly 60 may provide cost savings by reducing the number of operator steps involved in mounting sensor assemblies to vehicle bumper covers.

first sensor assembly 60 bonding location on the B-surface 68 may also influence performance of a pedestrian protection system. For example, a desired functionality of the sensor 62 may be to identify and/or determine a type of object at impact. Object characteristics, such as but not limited to density and weight, may vary between different types of objects and influence the effect of the impact. (A vehicle to tree collision, for example, may have a different impact effect on a vehicle than a vehicle to pedestrian collision.) A sensor system safety feature with a capability to identify and/or determine the type of object at impact and activate a response based on the determining may assist in reducing damage to the vehicle and/or object. The sensor system safety feature may determine that a density of an object at impact is below a predetermined threshold and as such, activate the vehicle response to reduce the vehicle force impacting the object.

For example, if a vehicle to pedestrian impact is at the bumper cover 70 of a vehicle and the system safety feature receives a detection signal from sensor 62 indicating the pedestrian has a density below or above a predetermined threshold, the safety feature may direct the vehicle's hood to "pop," or may direct deployment of an energy absorbing hood panel to reduce an amount of force transferred from the vehicle to the pedestrian. This effect is similar to a crumple-zone and may be increasingly effective with greater crush distances. It may therefore be advantageous to position the sensor 62 and/or first sensor assembly 60 at or near a potential impact zone on a vehicle to promote detection upon impact.

FIG. 4 shows an illustrative sensor assembly, referred to generally as a second sensor assembly 100 which may include a sensor 104 and a housing 106. The second sensor assembly 100 may be positioned on a bumper cover 102 for an automotive vehicle or other vehicle locations. An example of a sensor 104 may include an acceleration sensor or a park aid sensor as described above. In certain applications, pressure sensors may be another example of a sensor 104. The housing 106 may be integrated with the bumper cover 102. The housing 106 may define a base portion 107. In one example, a planar tab (not shown) may be embedded to the housing 106 and may be bonded to a fascia B-surface 108 of the bumper cover 102 or other portions of fascia throughout the vehicle. Two examples of bonding methods may include ultrasonic welding and adhesive bonding. The planar tab may preferably have a thickness between one and three millimeters to facilitate a desired ultrasonic weld. An ultrasonic weld of the planar tab with a thickness above three millimeters may result in a dimple or other deformation to an A-surface 110 of the bumper cover 102. The planar tab may be, without limitation, a plastic strip or a material the same as a material used for the bumper cover 102. The distance between the B-surface 108 and second sensor assembly 100 may be less than or equal to a desired planar tab thickness. Additionally and/or optionally, the planar tab may be an extension of the housing 106. Further, it is contemplated that the second sensor assembly 100 may be integrated with other components of the vehicle. For example, the second sensor assembly 100 may be bonded to fascia B-surfaces of a hood, door or trunk of the vehicle. The housing 106 may also be molded as part of the fascia B-surface, such as fascias incorporated with the bumper cover 102 or as part of the other components of the vehicle listed above.

A lever 112 may be rotatably attached to the sensor 104 and configured to selectively rotate between first and second positions further described herein. The sensor 104 may include a connector 109 and define at least one exterior sensor tab 111 and at least one nub 113. The lever 112 may define at least one prevention tab 114, at least one lock tab 115, and at least one extrusion 116. The prevention tab 114 may be positioned proximate to the connector 109 and configured to prevent mating access to the connector 109 when the lever 112 is in the first position but not in the second position. The at least one lock tab 115 may be configured to hold the lever 112 in the first position relative to the sensor 104 and, in response to the sensor 104 being installed within the housing 106 as further described below, to release the lever 112 from the first position to permit the lever 112 to rotate to the second position. The housing 106 may define at least one interior lever guide 118 which may be configured to receive the at least one extrusion 116. Further, the at least one interior lever guide 118 may define a path for the at least one extrusion 116 to slide along which may include an extension portion 117. The extension portion 117 may provide a path for the at least one extrusion 116 to enter such that the lever 112 may rotate when released. The housing 106 may also define at least one interior ramp 119, at least one interior nub guide 124 to receive the nubs 113, and a hold tab 128 configured to hold a portion of the lever 112 as described below.

Figure 5:
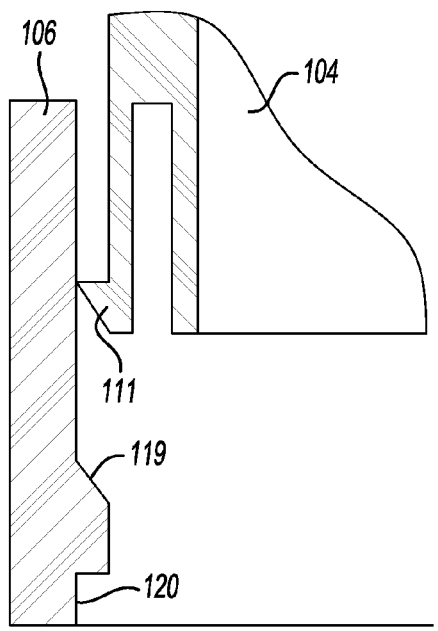
FIG. 5 is a front view of a portion of the sensor from FIG. 4 including a flexible tab.
Figure 6:
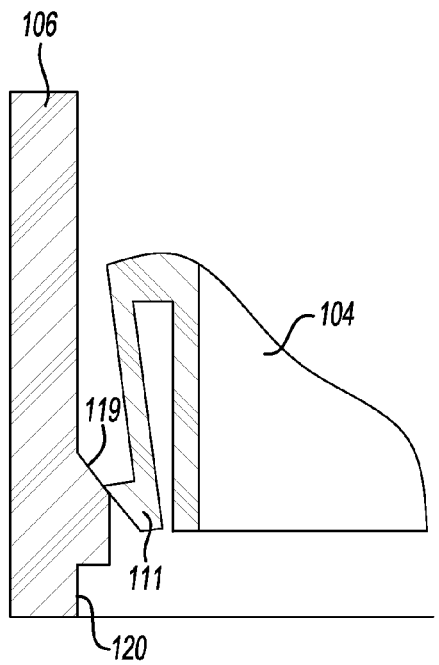
FIG. 6 is a front view of a portion of the sensor from FIG. 4 showing the flexible tab flexing against a ramp.
Figure 7:
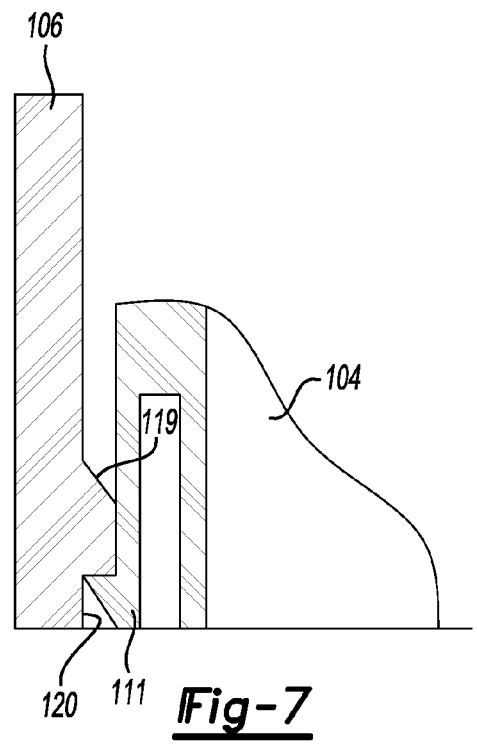
FIG. 7 is a front view of a portion of the sensor from FIG. 4 showing the flexible tab engaged in a notch below the ramp.
Figure 8:
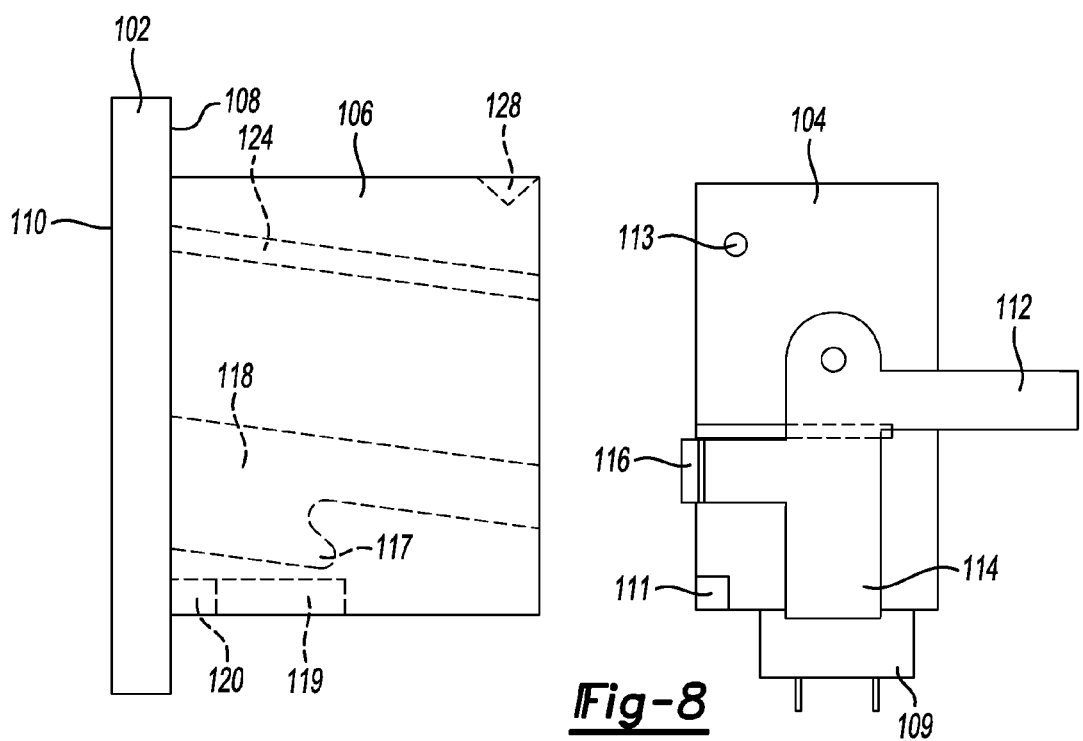
FIG. 8 is a side view of the sensor and sensor housing from FIG. 4 prior to installing the sensor into the housing.
Figure 9:
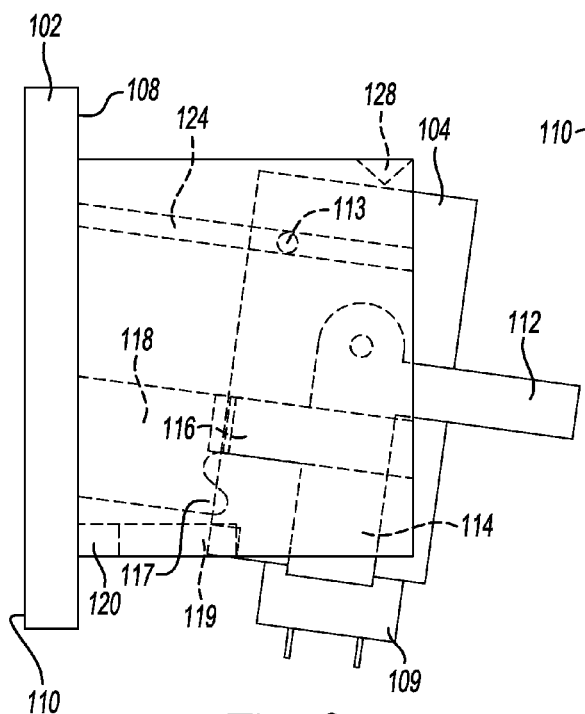
FIG. 9 is a side view of the sensor and sensor housing from FIG. 4 in which the sensor is shown partially installed within the housing.
Figure 10:
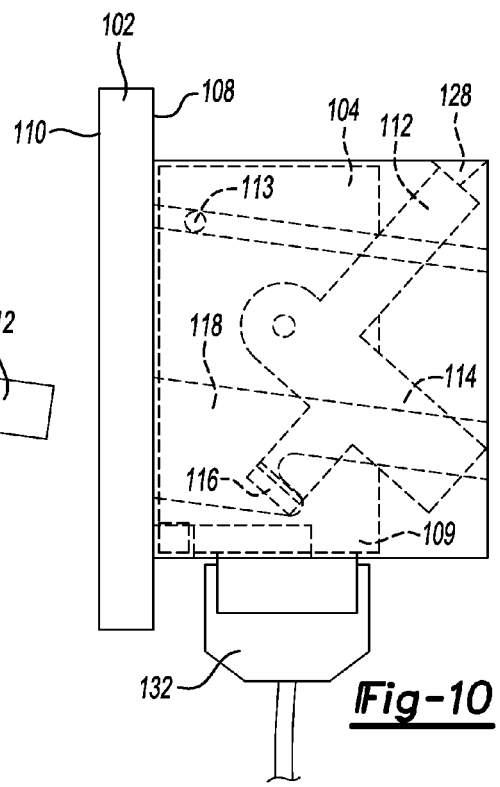
FIG. 10 is a side view of the sensor housing from FIG. 4 in which the sensor is shown installed within the housing.

Referring now to FIGS. 5 through 7, a portion of the sensor 104 and housing 106 are shown prior to installation of the sensor 104 within the housing 106. The lock tab 115 of the lever 112 may be engaged with a portion of the exterior sensor tab 111 such that the lever 112 is held in the first position relative to the sensor 104. As the sensor 104 enters the housing 106, the interior lever guides may receive the extrusions 116 and the interior nub guides 124 may receive the nubs 113. The interior ramps 119 may direct the exterior sensor tab 111 to flex inward during contact therewith as shown in FIG. 6. When the exterior sensor tab 111 flexes inward, the lock tab 115 disengages from the portion of the exterior sensor tab 111 such that the lever 112 may rotate from the first position to the second position. In FIG. 7, the exterior sensor tab 111 is shown seated below the ramp 119 in a notch 120. FIGS. 8 through 10 further assist in illustrating the installation process by showing three installation stages of the sensor 104 to the housing 106 from a side view.

In FIG. 8, the lever 112 is in the first position relative to the sensor 104 and the lock tabs 115 are engaged with the exterior sensor tabs 111. In FIG. 9, the sensor 104 is shown partially installed within the housing 106. Here, the lock tabs 115 have been disengaged from the exterior sensor tabs 111 and the lever 112 is shown rotated upward from the first position. In FIG. 10, the sensor 104 is shown installed within the housing 106 in the second position. In this second position, a portion of the lever 112 is engaged with the hold tab 128 and the prevention tabs 114 no longer prevent mating access to the connector 109. Another connector, such as wire harness 132, may mate with the connector 109 in the second position.

Figure 11:
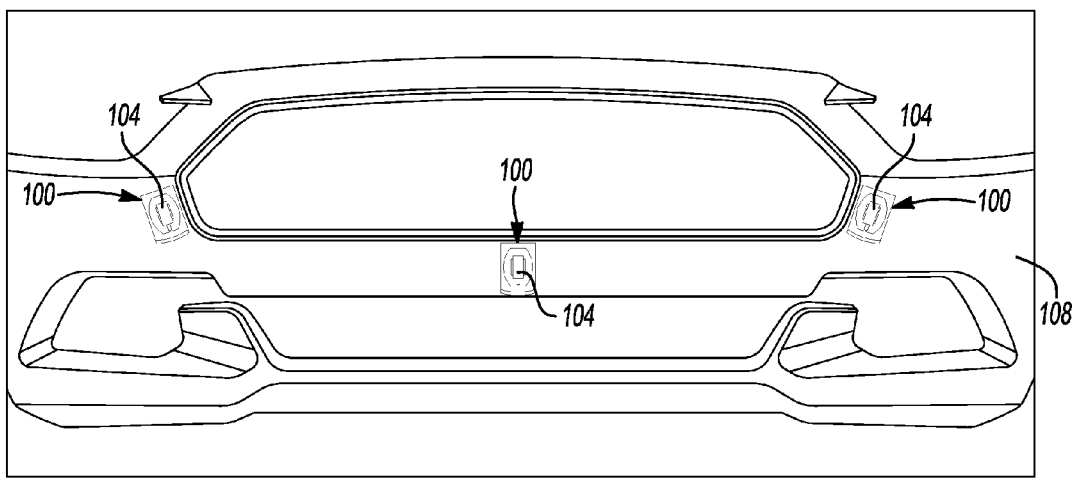
FIG. 11 is a rear view of three sensor assemblies attached to a bumper cover.

Additionally, utilizing multiple sensor assemblies 100 may also improve and/or increase the capability to detect an object at impact. FIG. 11 shows an illustrative configuration for a group of sensor assemblies 100. Each second sensor assembly 100 may be positioned in an area and/or zone on a vehicle fascia where an impact is most likely to occur and/or most often occurs. A corresponding number of wire harnesses may connect to the sensors 104 when in the second position to receive information obtained by the sensors 104. This information may then be transmitted to, for example, a controller.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a bumper beam;
   a bumper cover including an inner surface; and
   a sensor assembly disposed between the beam and cover, and including
      a housing integrated with the inner surface and defining at least one interior lever guide and at least one interior ramp,
      a sensor including a connector and at least one exterior sensor tab, and
      a lever rotatably attached to the sensor, configured to selectively rotate between first and second positions, and defining at least one lock tab, extrusion, and connector prevention tab proximate to the connector, wherein the connector prevention tab is configured to prevent mating access to the connector when the lever is in the first position but not in the second position and wherein the at least one lever guide is configured to receive the at least one extrusion to guide installation of the sensor within the housing as the at least one sensor tab is directed to move along the at least one ramp to release the at least one lock tab such that the lever may rotate from the first position to the second position.

2. The vehicle of claim 1, wherein the at least one lock tab of the lever is further configured to engage the at least one exterior sensor tab and hold the lever in the first position when the sensor is not installed within the housing.

3. The vehicle of claim 1, wherein the housing further defines a hold tab configured to engage a portion of the lever to hold the lever in the second position.

4. The vehicle of claim 1, wherein the sensor further defines at least one nub and wherein the housing further defines at least one nub guide configured to receive the nub to further guide installation of the sensor within the housing.

5. The vehicle of claim 1, wherein the at least one lever guide defines an extension portion configured to receive the at least one extrusion such that the lever may rotate when the at least one extrusion is positioned therein.

6. The vehicle of claim 1, further comprising a planar tab and wherein the housing is bonded to the inner surface via the planar tab.

7. The vehicle of claim 6, wherein a material of the planar tab is the same as a material of the bumper cover.

8. A vehicle comprising:
   a bumper beam;
   a bumper cover having an inner surface;
   a housing disposed between the bumper beam and bumper cover, and defining a base bonded to the inner surface;
   a sensor disposable within the housing and including a connector; and
   a lever rotatably attached to the sensor, defining at least one lock tab configured to hold the lever in a first position relative to the sensor and, in response to the sensor being installed within the housing, to release the lever from the first position to permit the lever to rotate to a second position, and defining two prevention tabs configured to prevent mating access to the connector when the lever is in the first position but not in the second position.

9. The vehicle of claim 8, wherein the housing further defines at least one interior ramp configured to move an exterior sensor tab of the exterior sensor inward to release an engagement between the at least one lock tab and the exterior sensor tab.

10. The vehicle of claim 8, wherein the housing further defines at least one lever guide configured to receive an extrusion defined by the lever to guide installation of the sensor within the housing.

11. The vehicle of claim 8, wherein the housing further defines at least one interior nub guide configured to receive at least one nub defined by the sensor.

12. The vehicle of claim 8, wherein the housing further defines a hold tab configured to engage a portion of the lever to hold the lever in the second position.

13. The vehicle of claim 8, wherein the base is bonded to the inner surface via a planar tab.

14. The vehicle of claim 13, wherein a material of the planar tab is the same as a material of the bumper cover.

15. A fascia assembly comprising:
a fascia having an inner surface; and
a sensor assembly including a housing integrated with the inner surface, a sensor having a connector, and a lever rotatably attached to the sensor and configured to selectively rotate between first and second positions when inserted into the housing, and including a tab to prevent mating access to the connector when the lever is in the first position but not in the second position.

16. The fascia assembly of claim 15, wherein the lever defines at least one lock tab configured to maintain the lever in the first position until the sensor and lever are inserted into the housing.

17. The fascia assembly of claim 15, wherein the housing further defines at least one interior ramp configured to move at least one exterior sensor tab when contacted to disengage an engagement between the at least one exterior sensor tab and a lock tab defined by the lever.

18. The fascia assembly of claim 15, wherein the housing further defines a hold tab configured to flex and receive the lever such that the lever is held in the second position.

19. The fascia assembly of claim 15, wherein the housing further defines at least one nub guide configured to receive at least one nub defined by the sensor.

20. The fascia assembly of claim 15, wherein the integration of the housing with the inner surface is facilitated via a planar tab defined by the housing and ultrasonically welded to the inner surface.

21. The fascia assembly of claim 15, wherein the housing and inner surface are molded or adhesively bonded together.

* * * * *